(12) United States Patent
Kim

(10) Patent No.: US 6,175,540 B1
(45) Date of Patent: Jan. 16, 2001

(54) TRACKING CONTROL METHOD AND APPARATUS

(75) Inventor: Dae Young Kim, Seoul (KR)

(73) Assignee: LG Electronics Inc., Seoul (KR)

( * ) Notice: Under 35 U.S.C. 154(b), the term of this patent shall be extended for 0 days.

(21) Appl. No.: 09/134,350

(22) Filed: Aug. 14, 1998

(30) Foreign Application Priority Data

Aug. 16, 1997 (KR) .................................................. 97-39053

(51) Int. Cl.[7] ....................................................... G11B 7/09
(52) U.S. Cl. ................................. 369/44.35; 369/44.28; 369/44.13
(58) Field of Search ............................. 369/44.35, 44.34, 369/44.27, 44.28, 44.29, 44.41, 44.32, 44.26, 47, 58, 124.01, 124.05, 44.13

(56) References Cited

U.S. PATENT DOCUMENTS 5,875,157 * 2/1999 Sasaki et al. ....................... 369/44.29
5,982,722 * 11/1999 Hashimoto ....................... 369/44.34 X
5,986,989 * 11/1999 Takagi et al. .................. 369/44.34 X

* cited by examiner

Primary Examiner—Muhammad Edun (57) ABSTRACT

A tracking control apparatus for effectively compensating for a direct current offset of a tracking error signal when a recording medium having wobbled land and groove tracks is accessed. In the apparatus, a light beam is irradiated onto signal tracks of a recording medium including successively formed wobbled areas or intermittently formed wobbled areas, and a reflective light is detected by a photo detector divided into a plurality of areas. Signals detected by two areas of the photo detector symmetrically divided on a basis of the direction of the track are subtracted to generate a difference signal. Also, signals detected by the two area of the photo detector are added to generate a sum signal. A tracking offset compensating signal is generated based on the difference signal and the sum signal. The tracking error signal is compensated by the tracking offset compensating signal, so that a light beam can accurately trace the signal tracks.

20 Claims, 9 Drawing Sheets

FES

SES

DCS

SCS

MS

DCOF

FIG.8A  ← 4,8

FIG.8B
 FES
 SES
 DCS
 SCS
 MS
 DCOF

FIG. 9

TRACKING CONTROL METHOD AND APPARATUS

BACKGROUND OF THE INVENTION

1. Field of the Invention

This invention relates to an optical information recording and reproducing apparatus, and more particularly to a tracking control apparatus and method wherein a light beam accurately trace signal tracks formed on a recording medium to include a wobbled area.

2. Description of the Prior Art

Recently, an optical recording medium, an optical magnetic recording medium and so on have been developed as a recording medium for recording various information such as video and audio information, etc. and is commercially available in the market. Such an optical recording medium includes a read-only type disc such as CD, CD-ROM, DVD-ROM, etc., a write-once-read-many type disc such as CD-R, DVD-R, etc., and a rewritable type disc such as CD-RW, DVD-RAM, etc.

In reproducing the optical disc, a light beam must be irradiated onto the center of a track recorded with an information to trace the track at a constant speed so that a photo detector may accurately detect a variation in a light quantity reflected by the track and further an accurate information may be reproduced from electrical signals from the photo detector. In this case, a converged state of a light irradiated onto the track is controlled in accordance with a distribution of a reflected light irradiated onto the photo detector. Also, a tracking state is controlled in accordance with a distribution of a reflected light irradiated onto the photo detector. Electrical signals converted by means of the photo detector are processed to thereby detect a rotation speed of the optical disc, which is controlled in accordance with the detected rotation speed. Further, since a reproducing position on the optical disc, that is, a track position onto which a laser beam is irradiated is seen from the reproduced information, the optical disc is accessed in a random basis.

However, since a recording disc has not been recorded with signals as described above, it must be manufactured to have such a signal track structure that is capable of recording an information. The signal track must be formed to have land and groove pattern in such a manner to indicate a tracking state, and support signals indicating a rotation speed of the disc are written into the signal track. Also, a physical position information is written into the signal track so that a random access of the recording optical disc is available at the time of recording.

Figure 1:
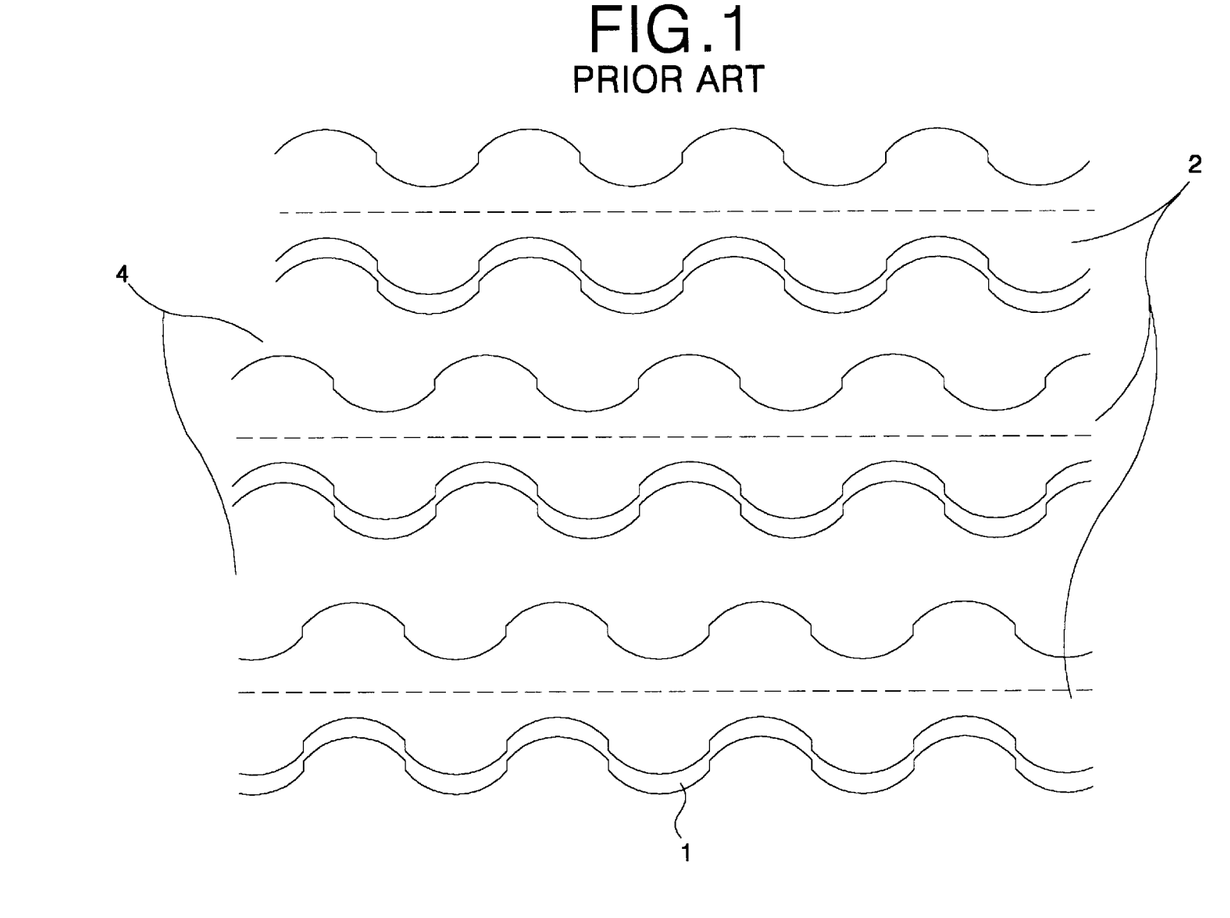
FIG. 1 is a schematic view showing the structure of a CD or CD-RW having wobbled areas.

Accordingly, in an optical disc such as CD-R, CD-RW and so on, as shown in FIG. 1, there are formed signal tracks 2 and 4 continued in a spiral shape and having land and groove patterns. In such an optical disc, groove signal tracks 4 only are usually used as tracks for recording an information. The groove track 4 includes an wobbled area 1 in which a certain period of wobbling signal is preformatted. The wobbling signal includes an address and the like indicating the physical position of a signal track. A rotation speed information of the optical disc and a recording position information of the optical disc, that is, an information about a position of the signal track onto which a laser beam is irradiated, are obtained from the wobbling signal on the wobbled area 1.

Figure 2:
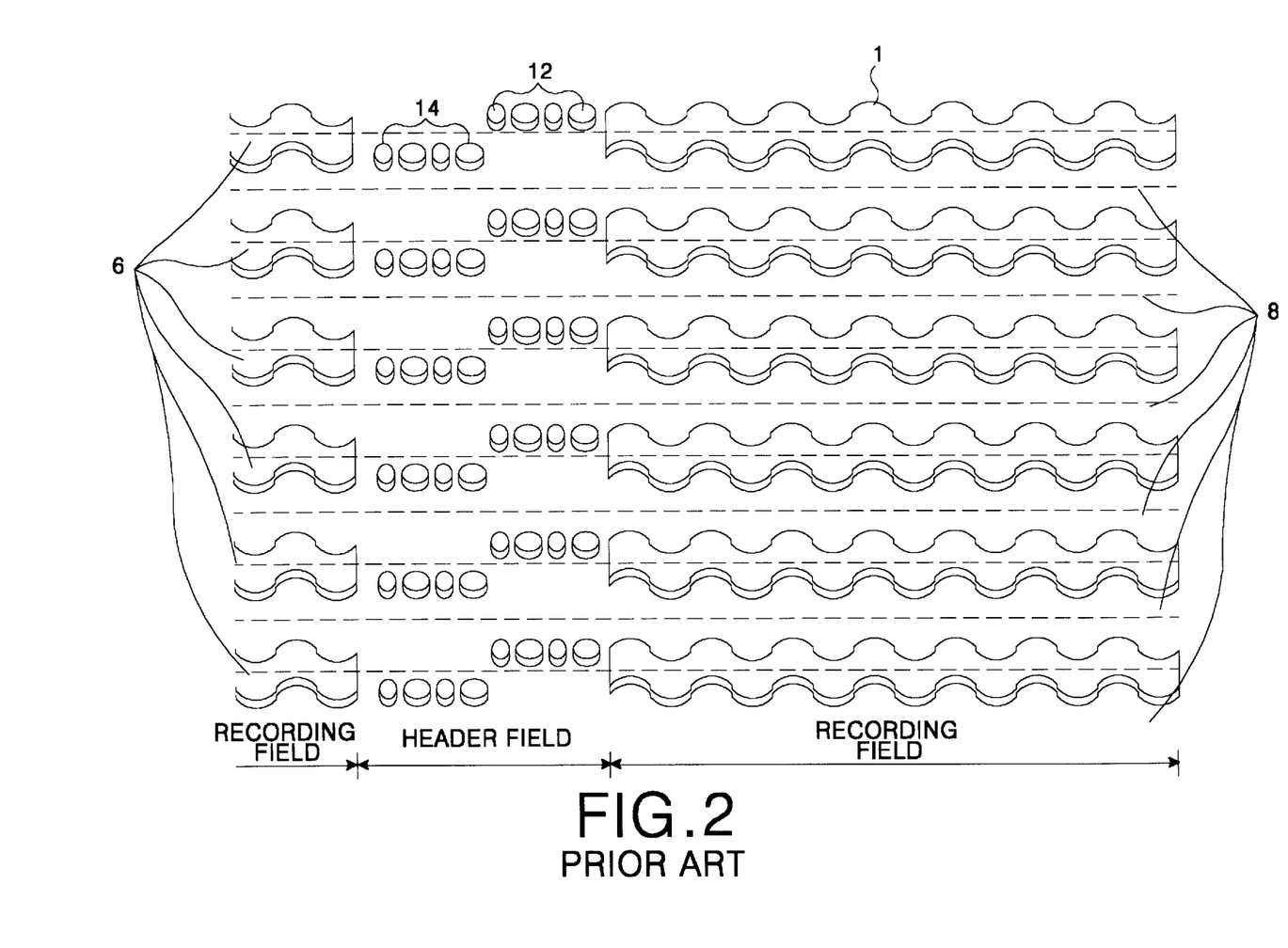
FIG. 2 is a schematic view showing the structure of a DVD-RAM having prepit stream.

Likewise, in a DVD-RAM, as shown in FIG. 2, signal tracks 6 and 8 having land and groove patterns are intermittently formed. These signal tracks 6 and 8 is divided into data sectors which each consists of a head field and a recording field. The head field is provided with prepit stream 12 and 14, and the recording field is provided with land or groove racks 6 or 8. Each prepit stream 12 and 14 include a sector identification code so as to indicate the physical position of the data sector. The first prepit stream 12 indicates the physical position of the land signal track 12 and the second prepit stream 14 indicates the physical position of the groove signal track 14. Wobbled areas, in which a certain period of wobbling signals are preformatted in the same phase, are formed at each side of the land or groove signal track 6 or 8.

In order to allow a light beam to trace the center of land and groove tracks defined in a recording medium, there has been widely used a tracking control apparatus which is classified into three beam system and one beam system called "pushpull system". Most information recording and reproducing apparatus have employed the tracking control apparatus of one beam system because the tracking control apparatus of one beam system is capable of simplifying a configuration of optical pickup as well as enhancing a light efficiency at the time of recording in comparison to the tracking control apparatus of three beam system. advantages of the one beam system tracking control apparatus will he apparent from the following description with reference to FIGS. 3A and 3B.

Figure 3A:
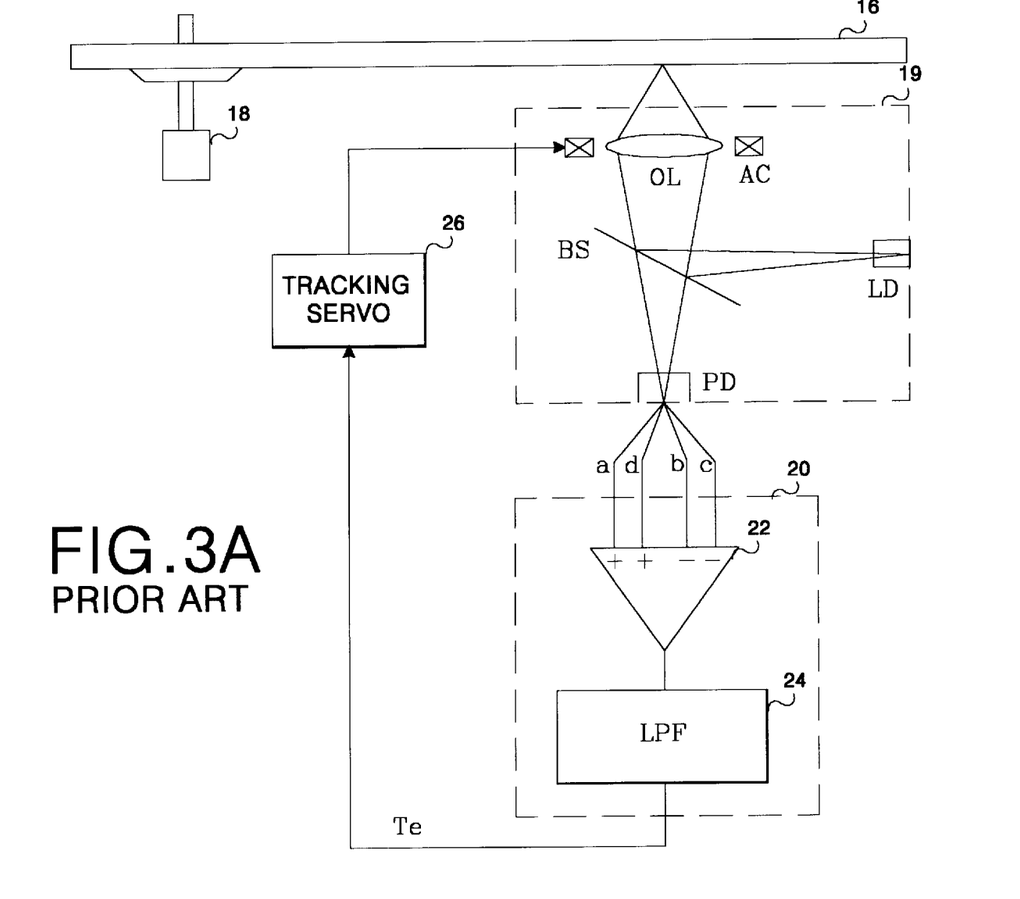
FIG. 3A is a schematic view showing the configuration of a conventional tracking control apparatus of one beam system.
Figure 3B:
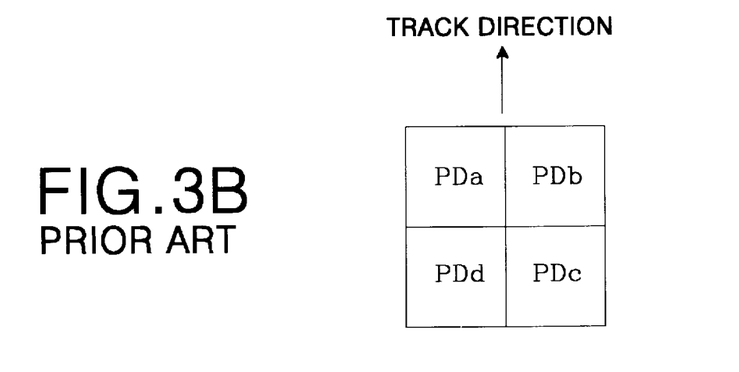
FIG. 3B is a detailed view of the photo detector shown in FIG. 3A.

Referring to FIG. 3A, the one beam system tracking control apparatus includes a spindle motor 18 for rotating an optical disc 16, an optical pickup 19 for accessing the optical disc 16, and a tracking error detector 20 and a tracking servo 26 that are connected, in series, to the optical pickup 19. The optical pickup 19 includes a beam splitter BS for guiding a light beam from a laser diode LD to an objective lens OL and a light beam from the objective lens OL to a photo detector PD, and an actuator AC for moving the objective lens OL in the up, down, left, and right direction to perform a focusing and a tracking. The objective lens OL converges a light beam progressing from the beam splitter BS to the optical disc 16. The beam splitter BS allows a light beam from the laser diode LD to be irradiated, via the objective lens OL, onto land signal tracks 2 and 6 or groove signal tracks 4 and 8 of the optical disc 16, and allows a light beam reflected by the optical disc 16 to be progressed to a photo detector PD. The actuator AC moves the objective lens OL in the left and right direction in such a manner that a light beam trace the center lines of the land signal tracks 2 and 6 or the groove signal tracks 4 and 8. The photo detector PD converts a reflective light quantity received, via the objective lens OL and the beam splitter BS, from the optical disc 16 into an electrical signal. As shown FIG. 3B, the photo detector PD consists of four photo detecting pieces PDa, PDb, PDc and PDd so as to detect a distribution of a light irradiated on the signal tracks 2 and 6, or 4 and 8. The tracking error detector 20 receiving electrical signals from the four photo detecting pieces PDa, PDb, PDc and PDd includes a differential amplifier 22 for detecting a difference signal between a sum signal of electrical signals from two photo detecting pieces PDa and PDd positioned at the left side on the basis of a track direction and a sum signal of electrical signals from two photo detecting pieces PDb and PDc at the right side, and a low pass filter(LPF) 24 for making a low pass filtering of the difference signal from the differential amplifier 22 and applying the filtered difference signal to the tracking servo 26 as a tracking error signal Te. The tracking servo 26 receiving the tracking error signal Te from the LPF 24 responds to the tracking error signal Te to control a current signal or a voltage signal applied to the actuator AC, thereby moving the objective lens OL in the left or right direction, that is, in the outer or inner circumference direction of the optical disc in such a manner that a light beam traces the center line of the track.

Figure 4A:
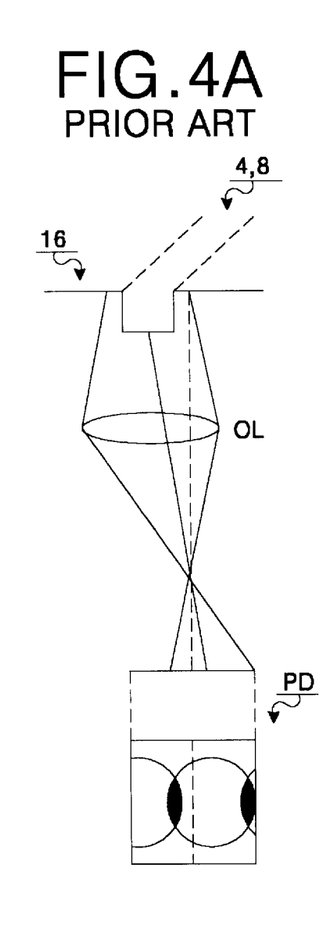
FIGS. 4A to 4C are a view for explaining a distributed state of a light irradiated to the photo detector in accordance with a movement of the objective lens shown in FIG. 3A.
Figure 4B:
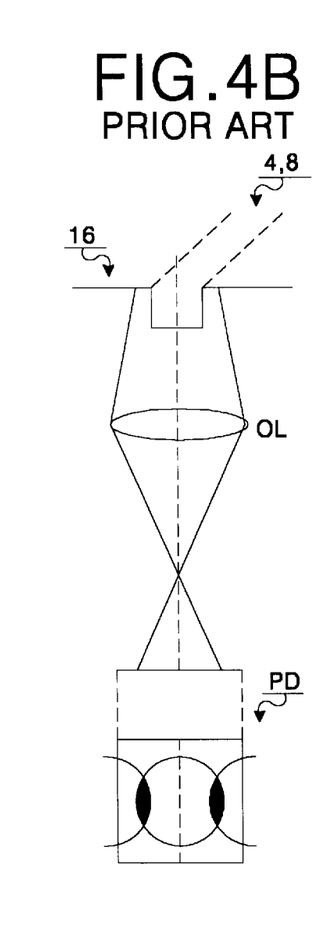
Figure 4C:
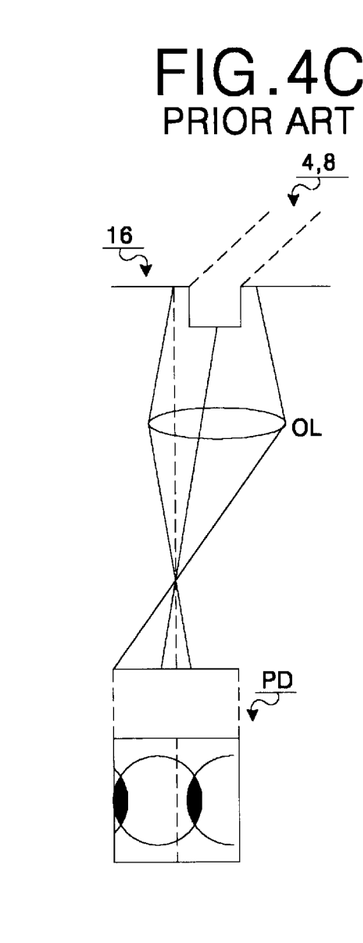

According to the tracking control apparatus of one beam system as described above, however, since a direct current (DC) offset is generated as the objective lens OL is moved in the left or right direction, it is difficult to allow a light beam to trace the center line of the signal track. This DC offset is generated when the center of the objective lens OL departs from the optical axis as shown in FIGS. 4A and 4C; while it is not generated when the center of the objective lens OL falls at the optical axis as shown in FIG. 4B. More specifically, since a light beam reflected from the optical disc 16 departs from the center of the photo detector PD when the center of the objective lens OL deviates to the left and light from the light axis as shown in FIGS. 4A and 4C, a distribution of a light irradiated to two left photo detecting pieces PDa and PDd and two right photo detecting pieces PDb and PDc of the photo detector PD does not become symmetrical. Due to this, a DC offset is generated at the tracking error signal. On the other hand, when the center of the objective lens OL is positioned at the light axis as shown in FIG. 4B, a light axis of a light beam reflected from the optical disc 16 meets the center of the photo detector PD, so that a distribution of a light irradiated to two left photo detecting pieces PDa and PDd and two right photo detecting pieces PDb and PDc of the photo detector PD becomes symmetrical. Accordingly, a DC offset is not generated at the tracking error signal. In view of this, the one beam system tracking control must be improved so that it can effectively compensate for a DC offset generated when applied to a recording medium having wobbled areas.

SUMMARY OF THE INVENTION

Accordingly, it is an object of the present invention to provide a tracking control method and apparatus that can effectively compensate for a direct current offset of a tracking error signal when a recording medium having wobbled land and groove signal tracks is accessed.

In order to achieve this and other objects of the invention, a tracking control apparatus according to one aspect of the present invention includes pickup means for irradiating a light beam onto a signal track of a recording medium and for detecting a reflective light using a photo detector divided into a plurality of areas, the recording medium including any ones of successively formed wobbled areas and intermittently formed wobbled areas; tracking error signal generating means for detecting a difference signal between signals detected by two areas of the photo detector and applying the difference signal as a tracking error signal, the two areas of the photo detector being symmetrically divided on a basis of the direction of the signal track; sum signal detecting means for detecting a sum signal of signals detected by the two areas of the photo detector; means for generating a tracking offset compensating signal based on the difference signal and the sum signal; and tracking control means for compensating for the tracking error signal based on the tracking offset compensating signal and controlling a position of the light beam using the compensated tracking error signal.

A tracking control apparatus according to another aspect of the present invention includes pickup means for irradiating a light beam onto a signal track of a recording medium and for detecting a reflective light using a photo detector divided into a plurality of areas, the recording medium including any ones of successively formed wobbled areas and intermittently formed wobbled areas; tracking error signal generating means for detecting a tracking error signal from a plurality signals detected by the plurality of areas of the photo detector; means for detecting a difference signal between signals detected by two areas of the photo detector, the two areas of the photo detector being symmetrically divided on a basis of the direction of the signal track; means for detecting a sum signal of signals detected by the two areas of the photo detector; means for generating a tracking offset compensating signal based on the difference signal and the sum signal; and tracking control means for compensating for the tracking error signal based on the tracking offset compensating signal and controlling a position of the light beam using the compensated tracking error signal.

A tracking control method according to still another aspect of the present invention includes the steps of irradiating a light beam onto a signal track of a recording medium and detecting a reflective light using a photo detector divided into a plurality of areas, the recording medium including any ones of successively formed wobbled areas and intermittently formed wobbled areas; detecting a difference signal between signals detected by two areas of the photo detector and applying the difference signal as a tracking error signal, the two areas of the photo detector being symmetrically divided on a basis of the direction of the signal track; detecting a sum signal of signals detected by the two areas of the photo detector; generating a tracking offset compensating signal based on the difference signal and the sum signal; and compensating for the tracking error signal based on the tracking offset compensating signal and controlling a position of the light beam using the compensated tracking error signal.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 5:
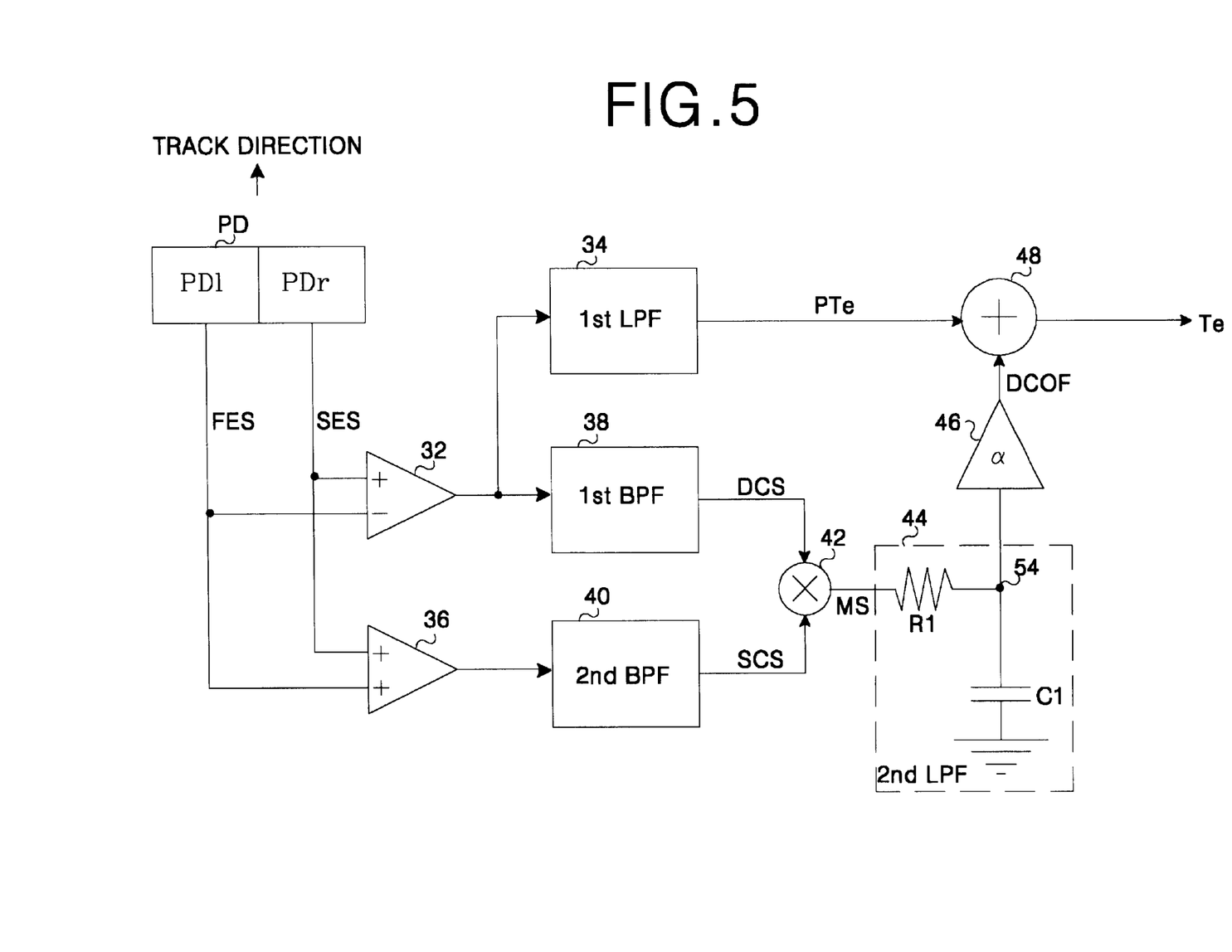
FIG. 5 is a block circuit diagram of a tracking error detector according to an embodiment of the present invention which is used instead of the tracking error detector of the tracking control apparatus in FIG. 3A.
Figure 6A:
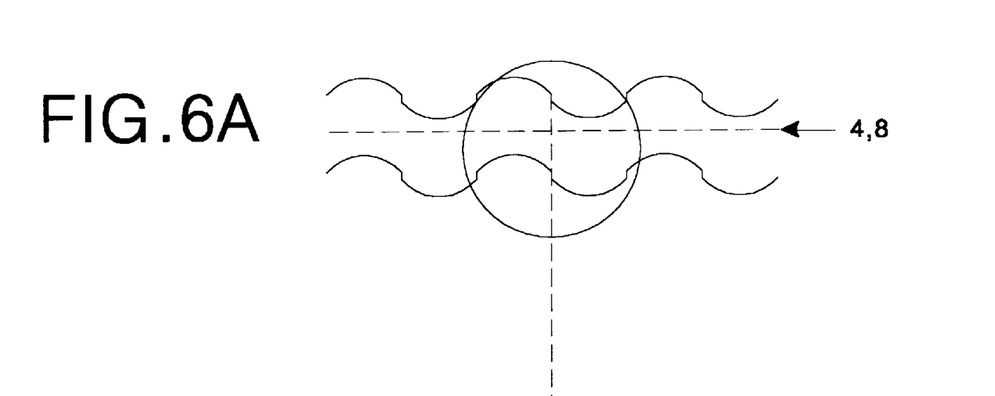
FIG. 6A illustrates a state in which a light beam axis is inclined to the left direction on the basis of the center axis of the objective lens.
Figure 6B:
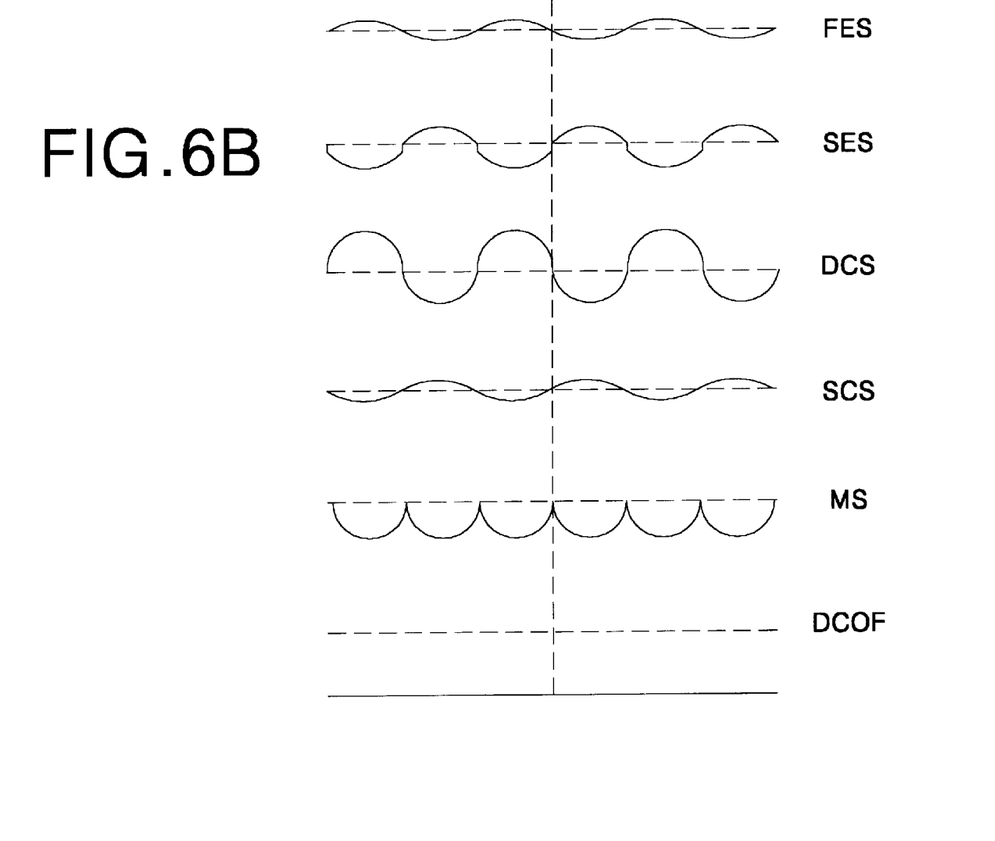
FIG. 6B is operational waveform diagrams of each part of the tracking error detector shown in FIG. 5 when a light beam axis is inclined to the left direction on the basis of the center axis of the objective lens.
Figure 7A:
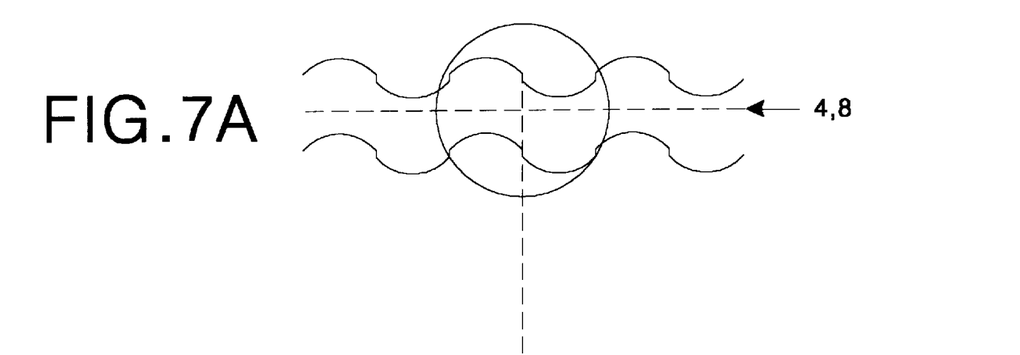
FIG. 7A illustrates a state in which a light beam axis meets the center axis of the objective lens.
Figure 7B:
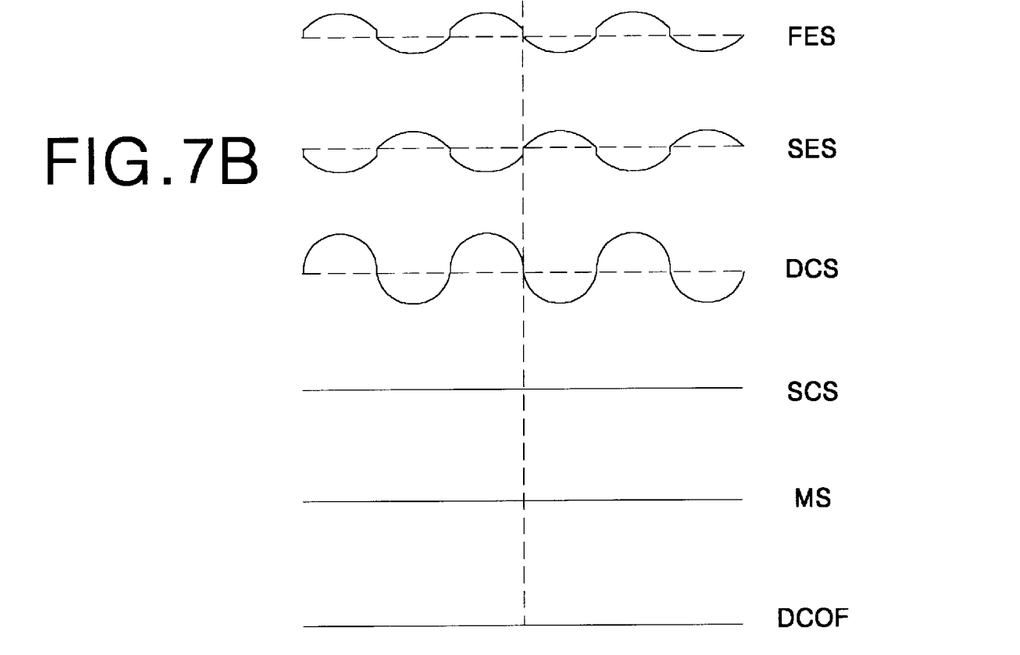
FIG. 7B is operational waveform diagrams of each part of the tracking error detector shown in FIG. 5 when a light beam axis meets the center axis of the objective lens.
Figure 8A:
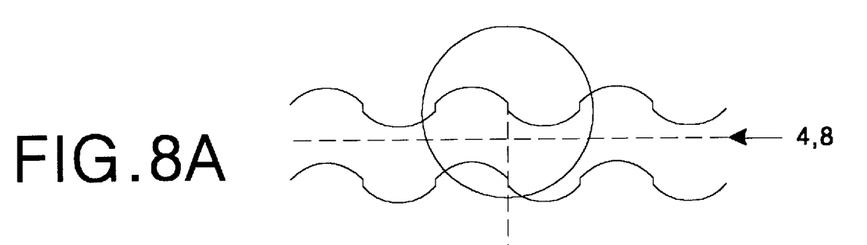
FIG. 8A illustrates a state in which a light beam axis is inclined to the right direction on the basis of the center axis of the objective lens.
Figure 8B:
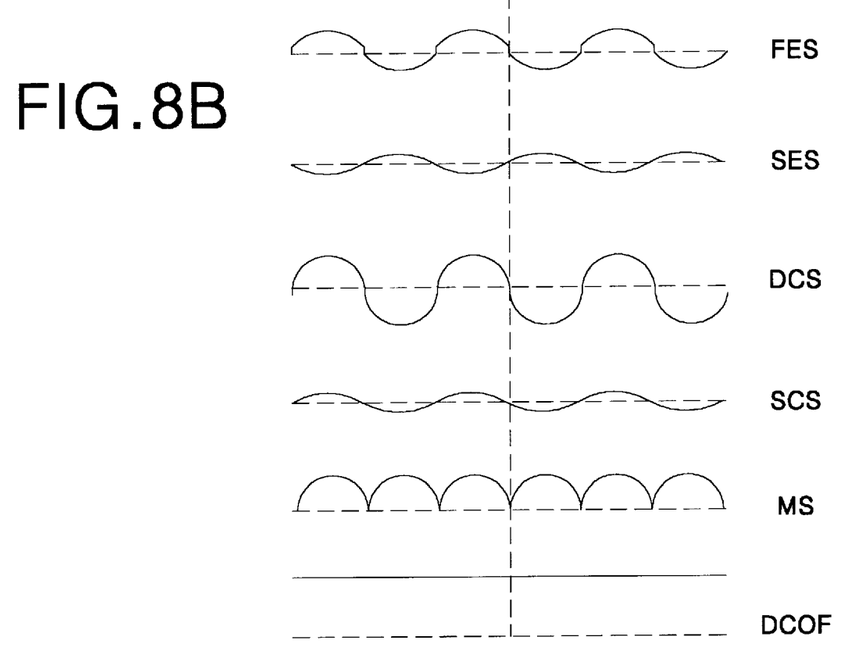
FIG. 8B is operational waveform diagrams of each part of the tracking error detector shown in FIG. 5 when a light beam axis is inclined to the right direction on the basis of the center axis of the objective lens.

Referring to FIG. 5, there is shown a tracking error detector of a tracking control apparatus according to an embodiment of the present invention with which the conventional tracking error detector 20 in FIG. 3A is replaced. A differential amplifier 32 included in the tracking error detector of FIG. 5 differentially amplifies a first electrical signal FES from a photo detecting piece PD1 positioned at the left side on the basis of the track direction and a second electrical signal SES from a photo detecting piece PDr positioned at the right side on the basis of the track direction, thereby detecting a difference signal between the first and second electrical signals FES and SES. Since two photo detecting pieces PD1 and PDr constructing a photo detector PD correspond to the wobbled areas 1 defined at each side of the signal tracks 2 and 4 like FIG. 1, the first and second electrical signals FES and SES have an opposite phase each other as shown in FIG. 6B, FIG. 7B and FIG. 8B. The two-divisional photo detector PD shown in FIG. 5 is included in the optical pickup and which may be replaced with the four-divisional photo detector PD shown in FIG. 3B. The difference signal generated at the differential amplifier 32 is low pass filtered by means of a low pass filter(LPF) 34 to eliminate a radio frequency component. At this time, the LPF 34 outputs the difference signal eliminating the radio frequency component as a pseudo tracking error signal PTe. This pseudo tracking error signal PTe may be generated through any methods different from the above-mentioned method which employs the differential amplifier 32 and the LPF 34.

An adding amplifier 36 included in the tracking error detector of FIG. 5 adds and amplifies the first and second electrical signals FES and SES from two photo detecting pieces PD1 and PDr to detect a sum signal of the electrical signals FES and SES. A first band pass filter(BPF) 38 makes a band pass filtering of the difference signal from the differential amplifier 32 to detect an envelop signal DCS of a difference component included in a predetermined frequency band. Even when a light beam axis is inclined to the left or right direction with respect to the center axis of the objective lens OL as shown in FIG. 6A and FIG. 8A, the difference component envelop signal DCS has a certain amplitude as shown in FIG. 6B and FIG. 8B. Likewise, a second band pass filter(BPF) 40 makes a band pass filtering of the sum signal from the adding amplifier 36 to detect an envelop signal SCS of a sum component included in a predetermined frequency band. When a light beam axis is inclined to the left or right direction with respect to the center axis of the objective lens OL as shown in FIG. 6A and FIG. 8A, the sum component envelop signal SCS has an opposite phase. Also, the sum component envelop signal SCS has an amplitude varying in accordance with an angle at which a light beam axis is inclined with respect to the center axis of the objective lens OL, as shown in FIG. 6B and FIG. 8B. When a light beam axis meets the center axis of the objective lens OL as shown in FIG. 7A, the sum component envelop signal SCS remains at a voltage level of '0' as shown in FIG. 7B. The respective output signals DCS and SCS of the first and second band pass filters 38 and 40 are applied to a multiplier 42. The multiplier 42 multiplies the difference component envelop signal DCS from the first BPF 38 by the sum component envelop signal SCS from the second BPF 40 and applies the multiplied signal MS, hereinafter referred to as "mixed signal", to a second LPF 44. The mixed signal MS has a negative(−) half-rectified waveform as shown in FIG. 6B when a light beam axis is inclined to the left side with respect to the center axis of the objective lens OL as shown in FIG. 6A; while it has a positive(+) half-rectified waveform as shown in FIG. 8B when a light beam axis is inclined to the right side with respect to the center axis of the objective lens OL as shown FIG. 8A. Otherwise, when a light beam axis meets the center axis of the objective lens OL as shown in FIG. 7A, the mixed signal MS remains at a voltage level of '0' as shown in FIG. 7B. The second LPF 44 consisting of a resistor R1 and a capacitor C1 integrates the mixed signal MS from the multiplier 42 to generate an average voltage of the mixed signal MS. The mixed signal MS is amplified by a constant amplification factor with the aid of an amplifier 46 and converted into a DC offset signal DCOF as shown in FIG. 6B, FIG. 7B or FIG. 8B.

Further, an adder 48 receiving the pseudo tracking error signal PTe from the first LPF 34 and the DC offset signal DCOF from the amplifier 46 adds the DC offset signal DCOF to the pseudo racking error signal PTe to generate a tracking error signal Te. This tracking error signal Te is applied to the tracking servo shown in FIG. 3A. Then, the tracking servo 26 responds to the tracking error signal Te to control a current signal or a voltage signal applied to the actuator AC, thereby moving the objective lens OL in the left or right direction. Accordingly, the light beam axis traces the center line of the track. As described above, in the tracking error detector, a voltage of the pseudo tracking signal PTe used as a reference tracking error signal is controlled by a voltage of the DC offset signal DCOF to thereby generate an accurate tracking error signal Te. Herein, FIG. 6A, FIG. 7A and FIG. 8A represents a relationship of a light beam axis as shown in FIG. 4A, FIG. 4B and FIG. 4C to the center axis of the objective lens OL in a plane shape.

Meanwhile, when an optical disc, as shown in FIG. 2, having header fields consisting of prepit stream and recording fields including wobbled areas is recorded and reproduced, a polarity of the tracking error signal must be inverted in accordance with whether the recorded and reproduced track is land or groove tracks, and the tracking error signal must be disregarded or compensated when the header fields are recorded and reproduced. Means for performing such a signal process must be added to the tracking error detector so that an optical disc as shown in FIG. 2 may be accurately recorded and reproduced.

Figure 9:
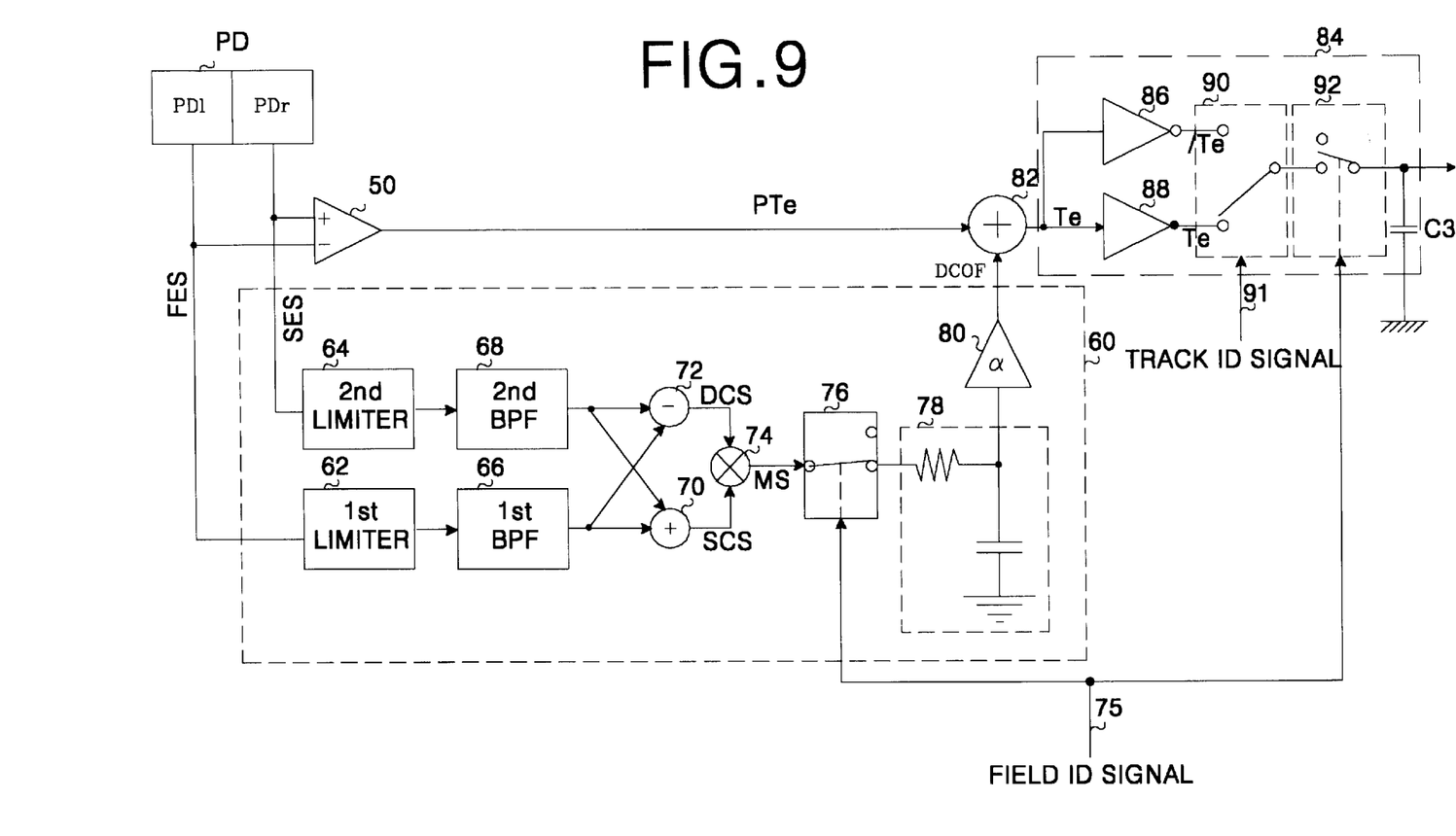
FIG. 9 is a block circuit diagram of a tracking error detector according to another embodiment of the present invention which is used instead of the tracking error detector of the tracking control apparatus in FIG. 3A.

Referring now to FIG. 9, there is shown a tracking error detector according to another embodiment of the present invention that is capable of accurately recording and reproducing the optical disc in FIG. 2. The tracking error detector shown in FIG. 9 is employed instead of the tracking error detector 20 in FIG. 3A. In FIG. 9, a differential amplifier 50 differentially amplifies a first electrical signal FES from a photo detecting piece PD1 positioned at the left side on the basis of the track direction and a second electrical signal SES from a photo detecting piece PDr positioned at the right side on the basis of the track direction, thereby detecting a difference signal between the first and second electrical signals FES and SES. Since two photo detecting pieces PD1 and PDr constructing a photo detector PD correspond to the wobbled areas 1 defined at each side of the signal tracks 6 and 8 like FIG. 2, the first and second electrical signals FES and SES have an opposite phase each other as shown in FIG. 6B, FIG. 7B and FIG. 8B. The two-divisional photo detector PD shown in FIG. 9 is included in the optical pickup and which may be replaced with the four-divisional photo detector PD shown in FIG. 3B. The difference signal generated at the differential amplifier 50 is provided as a pseudo tracking error signal PTe.

A DC offset detector 60 included in the tracking error detector of FIG. 9 detects a DC offset signal DCOF, which is generated when a light beam axis departs from the center of the objective lens, from first and second electrical signals FES and SES generated at two photo detecting pieces PD1 and PDr, respectively. To this end, the DC offset detector 60 includes a first limiter 62 for eliminating a component higher than a predetermined voltage level in the first electrical signal FES from the photo detecting piece PD1. The first electrical signal FES level-limited by means of the first limiter 62 is applied to a first BPF 66. The first band pass filter 66 makes a band pass filtering of the level-limited first electrical signal FES from the first limiter 62 to thereby detect an envelop signal included in a certain frequency band. The envelop signal detected by means of the first BPF 66 is commonly applied to an adder 70 and a subtractor 72. Likewise, a second limiter 64 included in the DC offset detector 60 eliminates a component higher than a predetermined voltage level in the second electrical signal SES from the photo detecting piece PDr. The second electrical signal SES level-limited by means of the second limiter 64 is applied to a second BPF 68. The second band pass filter 68 makes a band pass filtering of the level-limited second electrical signal SES from the second limiter 64 to thereby detect an envelop signal included in a certain frequency band. The envelop signal detected by means of the second BPF 68 is commonly applied to an adder 70 and a subtracter 72. The adder 70 generates a sum component envelop signal SCS which is obtained by adding the envelop signals from the first and second BPFs 66 and 68 and applies the sum component envelop signal SCS to a multiplier 74. The subtracter 72 generates a difference component envelop signal DCS which is obtained by subtracting the envelop signals from the first and second BPFs 66 and 68 and applies the difference component envelop signal ECS to the multiplier 74. Even when a light beam axis is inclined to the left or right direction with respect to the center axis of the objective lens OL as shown in FIG. 6A and FIG. 8A, the difference component envelop signal ECS has a certain amplitude as shown in FIG. 6B and FIG. 8B. On the other hand, when a light beam axis is inclined to the left or right direction with respect to the center axis of the objective lens OL as shown in FIG. 6A and FIG. 8A, the sum component envelop signal SCS has an opposite phase. Also, the sum component envelop signal SCS has an amplitude varying in accordance with an angle at which a light beam axis is inclined with respect to the center axis of the objective lens OL, as shown in FIG. 6B and FIG. 8B. When a light beam axis meets the center axis of the objective lens OL as shown in FIG. 7A, the sum component envelop signal SCS remains at a voltage level of '0' as shown in FIG. 7B. The multiplier 74 multiplies the difference component envelop signal DCS from the subtractor 72 by the sum component envelop signal SCS from the adder 70 and applies the multiplied signal MS, hereinafter referred to as "mixed signal", via a first control switch 76, to a LPF 78. The mixed signal MS has a negative(−) half-rectified waveform as shown in FIG. 6B when a light beam axis is inclined to the left side with respect to the center axis of the objective lens OL as shown in FIG. 6A; while it has a positive(+) half-rectified waveform as shown in FIG. 8B when a light beam axis is inclined to the right side with respect to the center axis of the objective lens OL as shown FIG. 8A. Otherwise, when a light beam axis meets the center axis of the objective lens OL as shown in FIG. 7A, the mixed signal MS remains at a voltage level of '0' as shown in FIG. 7B. A second control switch 76 allows the mixed signal MS from the multiplier 74 to be applied to a LPF 78 only during an interval when a light beam is irradiated onto a recording field of the signal track, that is, any one region of the signal track including wobbled areas. In other words, the second control switch 76 is turned on only when a specific logic of field identification signal indicating that a light beam is positioned at the according field is applied, via a first input line 75, hereto. The LPF 78 consisting of a resistor R2 and a capacitor C2 integrates the mixed signal MS, via the control switch 76, from the multiplier 74 to generate an average voltage of the mixed signal MS. The average voltage signal is amplified by a constant amplification factor a with the aid of an amplifier 80 and converted into a DC offset signal DCOF as shown in FIG. 6B, FIG. 7B or FIG. 8B. The control switch 76 allows the LPF 78 to perform an integration function as well as a sample and hold function, thereby accurately detecting the DC offset signal DCOF. This DC offset signal DCOF is added to the pseudo tracking error signal PTe generated at the differential amplifier 50 by means of a second adder 82 to generate a tracking error signal Te.

The tracking error detector in FIG. 9 further includes a signal sampler 84 for periodically sampling and holding as well as selectively inverting the tracking error signal Te to be transferred from the second adder 82 to the tracking servo 26. The signal sampler 84 responds to a field identification signal received via the first input line 75 to selectively perform the sample and hold operation for the tracking error signal Te. Also, the sampler 84 responds to a track identification signal received via a second input line 91 to selectively invert the tracking error signal Te. This is caused by a fact that a tracking error signal detected when a light beam is irradiated onto the land track has a phase difference of 180° with respect to a tracking error signal detected when a light beam is irradiated onto the groove track. Accordingly, an inversion of the tracking error signal is needed depending upon the land or groove track is being accessed. In order to perform such an operation, the signal sampler 84 includes an inverter 86 and a buffer 88 for commonly receiving the tracking error signal Te from the second adder 82, and a selection switch 90 for selectively connecting the inverter 86 and the buffer 88 to a second control switch 92 in accordance with a track identification signal received via the second input line 91. When a ground logic of track identification signal is applied via the second input line 91 (i.e., when the groove track is recorded or reproduced), the selection switch 90 connects the inverter 86 to the control switch 92. Thus, a tracking error signal /Te inverted by means of the inverter 86 is applied, via the selection switch 90, to the second control switch 92. On the other hand, when a specific logic of track identification signal is applied via the second input line 92 (i.e., when the land track is recorded or reproduced), a tracking error signal Te buffered by means of the buffer 88 is applied, via the selection switch 90, to the control switch 92. The control switch 92 is switched by responding a field identification signal received via the first input line 75, thereby sampling and holding the tracking error signal Te or the inverted tracking error signal /Te with the aid of a capacitor C3. More specifically, when a specific logic of field identification signal is applied (i.e., when the header field is accessed), the second control switch 92 is opened to prevent the tracking error signal Te or the inverted tracking error signal /Te from the selection switch 90 from being applied. At this time, the capacitor C3 holds the previously sampled tracking error signal Te or the inverted tracking error signal /Te. On the other hand, when a ground logic of field identification signal is applied (i.e., when the recording field is accessed), the control switch 92 is turned on to thereby apply the tracking error signal Te or the inverted tracking error signal /Te from the selection switch 90 to the capacitor C3. In this case, the capacitor C3 samples the tracking error signal Te or the inverted tracking error signal /Te from the second control switch 92. The tracking servo 22 in FIG. 3 responds to the tracking error signal Te or the inverted tracking error signal /Te sampled and holded by means of the capacitor C3 to control a current or a voltage signal applied to the actuator AC, thereby moving the objective lens OL in the left or right direction. As a result, a light beam axis traces the center line of the track. As described above, in the tracking error detector, a voltage of the pseudo tracking signal PTe used as the reference tracking error signal is controlled by a voltage of the DC offset signal DCOF to thereby generate an accurate tracking error signal Te.

As described above, in the tracking control apparatus according to the present invention, a DC offset included in the tracking error signal is effectively compensated when a recording medium having wobbling signals preformatted in the land and groove signal tracks is accessed, so that the tracking control can accurately performed. Also, in the tracking control apparatus according to the present invention, a tracking error signal is selectively inverted depending upon the land or groove track when accessing the recording medium, thereby accurately performing the tracking control. Further, in the tracking control apparatus according to the present invention, a tracking error signal is sampled or holded depending upon the existence of the signal track when a recording medium having land and groove signal tracks defined intermittently and having wobbling signals preformatted in the signal tracks is accessed, so that the tracking control can be accurately performed.

Although the present invention has been explained by the embodiments shown in the drawings described above, it should be understood to the ordinary skilled person in the art that the invention is not limited to the embodiments, but rather than that various changes or modifications thereof are possible without departing from the spirit of the invention. For example, it should be understood to the ordinary skilled person in the art that the tracking error detector shown in FIG. 5 and FIG. 9 is applicable to a tracking control apparatus of three beam system. Accordingly, the scope of the invention shall be determined only by the appended claims and their equivalents.

What is claimed is:

1. A tracking control apparatus, comprising:

pickup means for irradiating a light beam onto a signal track of a recording medium and for detecting a reflective light using a photo detector divided into a plurality of areas, the recording medium including any ones of successively formed wobbled areas and intermittently formed wobbled areas;

tracking error signal generating means for detecting a difference signal between signals detected by two areas of the photo detector and applying the difference signal as a tracking error signal, the two areas of the photo detector being symmetrically divided on a basis of the direction of the signal track;

sum signal detecting means for detecting a sum signal of signals detected by the two areas of the photo detector;

means for generating a tracking offset compensating signal based on the difference signal and the sum signal; and tracking control means for compensating the tracking error signal based on the tracking offset compensating signal and controlling a position of the light beam using the compensated tracking error signal.

2. The tracking control apparatus as claimed in claim 1, wherein the difference signal and the sum signal have envelop signals preformatted in the wobbled areas.

3. The tracking control apparatus as claimed in claim 1, wherein the tracking error signal generating means comprises:

a differential amplifier for differentially amplifying the signals from the two areas of the photo detector; and a band pass filter for making a band pass filtering of an output signal of the differential amplifier to detect the difference signal having a certain period of envelop.

4. The tracking control apparatus as claimed in claim 1, wherein the tracking error signal generating means comprises:

a limiter for level-limiting the signals from the two areas of the photo detector;

a band pass filter for making a band pass filtering of the level-limited signals from the limiter to detect a certain period of envelop signals; and a subtractor for subtracting the signals from the band pass filter to detect the difference signal having a certain period of envelop.

5. The tracking control apparatus as claimed in claim 1, wherein the sum signal detecting means comprises:

an adding amplifier for adding and amplifying the signals from the two areas of the photo detector;

a band pass filter for making a band pass filtering of an output signal of the adding amplifier to detect the sum signal having a certain period envelop.

6. The tracking control apparatus as claimed in claim 1, wherein the sum signal detecting means comprises:

a limiter for level-limiting the signals from the two areas of the photo detector;

a band pass filter for making a band pass filtering of the level-limited signals from the limiter to detect a certain period envelop signals; and an adder for adding the signals from the band pass filter to detect the sum signal having a certain period of envelop.

7. The tracking control apparatus as claimed in claim 1, wherein the offset compensating signal generating means comprises:

a multiplier for multiplying the difference signal by the sum signal;

a low pass filter for averaging an output signal of the multiplier; and an amplifier for amplifying an output signal of the low pass filter to generate the tracking offset compensating signal.

8. The tracking control apparatus as claimed in claim 7, wherein the offset compensating signal generating means further comprises:

a control switch for switching the output signal of the multiplier to be applied to the low pass filter in accordance with a field identification signal.

9. The tracking control apparatus as claimed in claim 1, wherein the tracking control means comprises:

an adder for adding the tracking offset compensating signal to the tracking error signal from the tracking error signal generating means.

10. The tracking control apparatus as claimed in claim 9, wherein the offset compensating signal generating means further comprises:

polarity inverting means for selectively inverting an output signal of the adder in accordance with a track identification signal; and sample and hold means for performing any one of sample and hold operations of an output signal of the polarity inverting means in accordance with a field identification signal.

11. A tracking control apparatus, comprising:

pickup means for irradiating a light beam onto a signal track of a recording medium and for detecting a reflective light using a photo detector divided into a plurality of areas, the recording medium including any ones of successively formed wobbled areas and intermittently formed wobbled areas;

tracking error signal generating means for detecting a tracking error signal from a plurality signals detected by the plurality of areas of the photo detector;

means for detecting a difference signal between signals detected by two areas of the photo detector, the two areas of the photo detector being symmetrically divided on a basis of the direction of the signal track;

means for detecting a sum signal of signals detected by the two areas of the photo detector;

means for generating a tracking offset compensating signal based on the difference signal and the sum signal; and tracking control means for compensating the tracking error signal based on the tracking offset compensating signal and controlling a position of the light beam using the compensated tracking error signal.

12. A tracking control method, comprising the steps of:

(A) irradiating a light beam onto a signal track of a recording medium and detecting a reflective light using a photo detector divided into a plurality of areas, the recording medium including any ones of successively formed wobbled areas and intermittently formed wobbled areas;

(B) detecting a difference signal between signals detected by two areas of the photo detector and applying the difference signal as a tracking error signal, the two areas of the photo detector being symmetrically divided on a basis of the direction of the signal track;

(C) detecting a sum signal of signals detected by the two areas of the photo detector;

(D) generating a tracking offset compensating signal based on the difference signal and the sum signal; and (E) compensating the tracking error signal based on the tracking offset compensating signal and controlling a position of the light beam using the compensated tracking error signal.

13. The tracking control method as claimed in claim 12, wherein the difference signal and the sum signal have envelop signals preformatted in the wobbled areas.

14. The tracking control method as claimed in claim 12, wherein the step (B) comprises:

differentially amplifying the signals from the two areas of the photo detector; and band pass filtering an differentially amplified signals to detect the difference signal having a certain period of envelop.

15. The tracking control method as claimed in claim 12, wherein the step (B)comprises:

level-limiting the signals from the two areas of the photo detector;

band pass filtering the level-limited signals from the limiter to detect a certain period of envelop signals; and subtracting the signals from the band pass filter to detect the difference signal having a certain period of envelop.

16. The tracking control method as claimed in claim 12, wherein the step (C) comprises:

adding and amplifying the signals from the two areas of the photo detector;

band pass filtering an output signal of the adding amplifier to detect the sum signal having a certain period envelop.

17. The tracking control method as claimed in claim 12, wherein the step (C) comprises:

level-limiting the signals from the two areas of the photo detector;

band pass filtering the level-limited signals from the limiter to detect a certain period envelop signals; and adding the signals from the band pass filter to detect the sum signal having a certain period of envelop.

18. The tracking control method as claimed in claim 12, wherein the step (D) comprises:

multiplying the difference signal by the sum signal;

averaging an output signal of the multiplier; and amplifying an output signal of the low pass filter to generate the tracking offset compensating signal.

19. The tracking control method as claimed in claim 18, wherein the step (D) further comprises:

selectively performing any one of sample and hold operations of the tracking offset compensating signal in response to a field identification signal.

20. The tracking control method as claimed in claim 12, wherein the step (E) comprises:

adding the tracking offset compensating signal to the tracking error signal;

selectively inverting the tracking error signal added by the tracking offset compensating signal; and performing any one of sample and hold operations of the selectively inverted tracking error signal in response to a field identification signal.

* * * * *